O. C. BEACH.
CENTRIFUGAL EXTRACTOR.
APPLICATION FILED AUG. 21, 1912.

1,105,954.

Patented Aug. 4, 1914.

WITNESSES

INVENTOR
O. C. BEACH
BY
ATTORNEYS

UNITED STATES PATENT OFFICE.

OSCAR C. BEACH, OF LOS ANGELES, CALIFORNIA, ASSIGNOR TO F. W. BRAUN, OF LOS ANGELES, CALIFORNIA.

CENTRIFUGAL EXTRACTOR.

1,105,954.  Specification of Letters Patent.  Patented Aug. 4, 1914.

Application filed August 21, 1912. Serial No. 716,233.

*To all whom it may concern:*

Be it known that I, OSCAR C. BEACH, a citizen of the United States, and a resident of the city of Los Angeles, county of Los Angeles, and State of California, have invented certain new and useful Improvements in Centrifugal Extractors, of which the following is a specification.

The invention relates to machines or devices for rapidly separating materials into their soluble and insoluble constituents by centrifugally driving a liquid solvent through the material.

The object of the invention is to provide a machine for separating a material into its soluble and insoluble constituents by centrifugally driving a liquid solvent for part of the constituents through the material and conserving the separated soluble and insoluble parts.

Another object of the invention is to provide a machine in which the action of the solvent or the condition of the material may be examined without opening the containing receptacle.

Another object of the invention is to provide a machine in which all of the soluble constituent and the soluble constituent only is separated from the material.

The invention possesses other advantageous features, which, with the foregoing, will be set forth at length in the following description, where I shall outline in full that form of the invention which I have selected for illustration in the accompanying drawings, in which—

Figure 1:
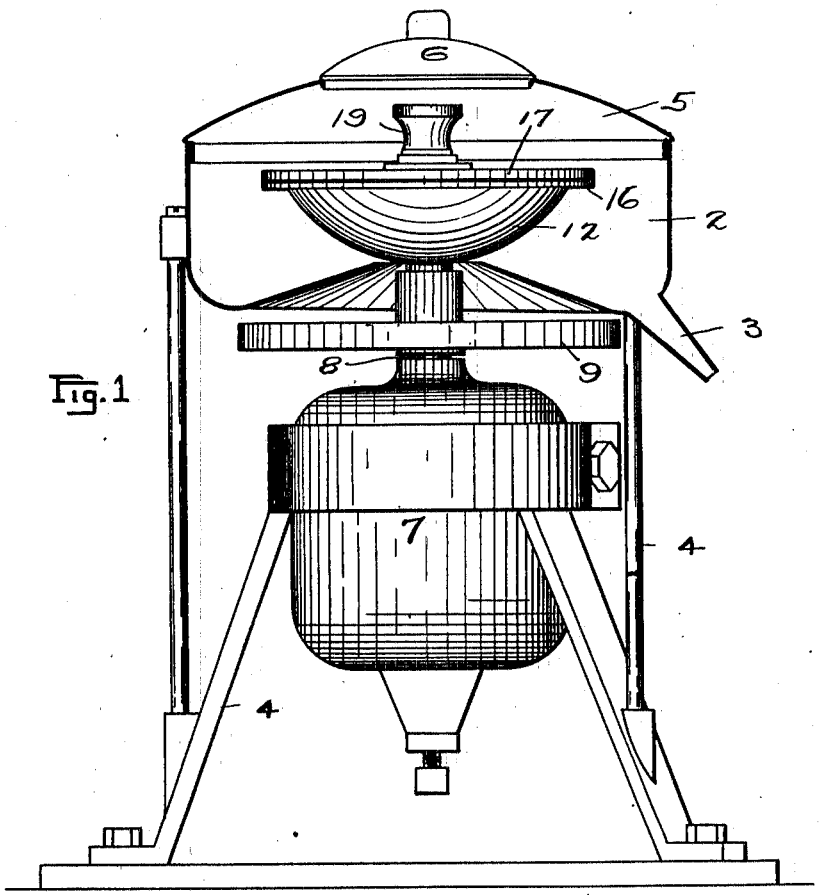
Figure 2:
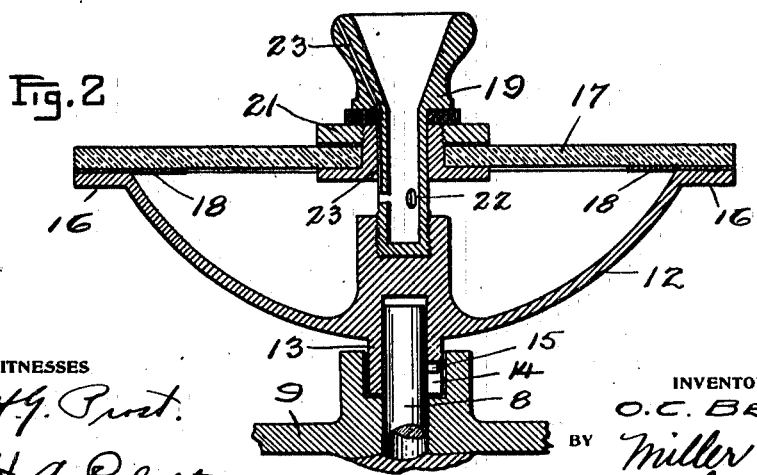

Figure 1 is an elevation of the device, the pan receiver being shown in section to disclose the interior thereof. Fig. 2 is a vertical section of the rotating or separating device.

The apparatus comprises a pan receiver 2 spun in one piece, the bottom of which is so inclined as to drain to the spout 3. The pan is mounted upon a suitable frame 4 and is provided with a removable cover 5 which is provided at the center with an aperture which is closed by the small cover 6.

Arranged below the pan 2 is a high speed electric motor 7 mounted on the frame 4 and arranged with its axis in the vertical position. Arranged on the shaft 8 of the motor is a fly-wheel 9 which operates to balance the rotating parts when an unbalanced load is placed in the separating receptacle. The separating receptacle 12 is concave in shape with the sides thereof sloping upward, and is provided at the center of the bottom with a hub 13 which fits over the motor shaft 8. The hub is provided with a slot 14 which engages the pin 15 on the motor shaft thereby locking the two parts together for motion in a rotary direction. The hub of the fly-wheel 9 is provided at its upper end with a depression into which the hub 13 fits, thereby producing a very rigid structure.

The receptacle 12 is provided with a flat circumferential flange 16, between which and the closing plate 17 is arranged an annular ring of filtering medium 18 such as filter or blotting paper. The external diameter of the filter ring 18 is equal to the external diameter of the flange 16 and its interior diameter is less than the interior diameter of the mouth of the receptacle, so that the paper extends into the receptacle for a considerable distance.

The closing plate 17 is formed of a transparent material such as plate glass, so that the condition of the material in the receptacle may be examined without removing the cover plate. The cover plate is held in place by the screw 19 engaging the hub 13 and bearing against the collar 21 secured to the cover plate. The screw is formed hollow, the upper end thereof sloping outward forming a funnel mouth and the lower end thereof being provided with apertures 22, to allow the solvent to be introduced without removing the cover plate. The filler screw is also provided with an air vent to allow the displaced air to escape as the solvent is introduced. The vent consists of a channel 23 extending along the side of the screw at the lower or straight portion thereof and passing through the upper or funnel portion of the screw.

The device is particularly adapted to be used in the extraction of bituminous aggregates to determine the percentages of bitumen and insoluble material in any given material, although it is evident that it may be used for other purposes. The aggregate is broken into small particles and is placed in the receptacle and the filter paper and cover plate securely attached, and a suitable amount of solvent, such as carbon bisulfid, is introduced through the filler screw. The receptacle is then rotated and the aggregate is thrown to the periphery of the receptacle between the filter paper and the side wall of the receptacle and the solvent is forced therethrough, dissolving the soluble constituents and is forced through the filter paper into the pan receiver, from which it is drained. By extending the filter paper into the receptacle the sand and other finer insoluble material collects on the finished surface of the paper, thereby insuring filtration without penetration of any of the finer particles. If the filter paper extended only to the inner edge of the receptacle, a portion of the finer particles would be forced therethrough, thereby causing a loss of the residue which it is desirable to retain, as a loss in this direction renders the results of the test or analysis inaccurate. The projecting filter paper also prevents the sand from collecting upon the glass and rendering it opaque.

It generally requires several charges of the solvent to completely dissolve all of the soluble constituents, and after the first charge has been driven off, the machine is stopped for the purpose of adding another charge. The small cover 6 arranged in the cover 5 is provided so that access may be had to the filler screw for introducing a charge of solvent without opening the entire pan 2, thereby reducing the loss of the solvent by evaporation. The side walls of the receptacle are comparatively steep causing the material to slide or fall to the bottom when the rotation ceases. The condition of the material may then be observed through the glass cover plate and the advisability of adding more solvent determined. Perfect separation is thereby rapidly obtained by the use of a minimum amount of solvent, and on account of the small supplemental cover the loss of solvent due to evaporation or splashing is reduced to the minimum.

I claim:

1. In a centrifugal extractor, the combination of a concave receptacle adapted to be rotated, a cover of transparent material closing the top of said receptacle and a filtering medium arranged between and separating the cover and the receptacle.

2. In a centrifugal extractor, the combination of a concave receptacle adapted to be rotated, a cover of transparent material closing the top of said receptacle, a filler screw adapted to clamp said cover in position and a filtering medium arranged between the cover and the receptacle.

3. In a centrifugal extractor, the combination of a rotatable concave receptacle adapted to hold a quantity of material provided at the bottom with a hub, a plate closing the top of said receptacle, a screw engaging said hub adapted to clamp the cover in place, said screw being hollow to permit the introduction of liquid into the closed receptacle and a filtering medium arranged between the cover and the receptacle.

4. In a centrifugal extractor, the combination of a rotatable concave receptacle adapted to hold a quantity of material, a hub at the bottom of said receptacle, a plate closing the top of said receptacle, a screw engaging said hub adapted to clamp the cover in place, said screw having a passage therein terminating at the upper end in a flaring opening, a second passage extending through said screw and a filtering medium between the receptacle and cover.

5. In a centrifugal extractor, the combination of a receptacle adapted to be rotated, a cover closing said receptacle, and a ring of filtering material arranged between the cover and the receptacle and extending into the receptacle.

6. In a centrifugal extractor the combination of a rotatable concave receptacle provided with a flat circumferential flange, a closing plate of substantially the same diameter as said flange, means for clamping the plate to the receptacle, and an annular ring of filter paper having the same external diameter as said flange and a width greater than said flange arranged between the flange and the closing plate.

7. In a centrifugal extractor, the combination of a receptacle adapted to be rotated provided with a flat circumferential flange, a cover closing the top of said receptacle and adapted to be attached thereto, and a ring of filtering material arranged between said cover and said flange and extending into said receptacle in contact with said cover.

In testimony whereof, I have hereunto set my hand at Los Angeles, Cal., this 12th day of August, 1912.

OSCAR C. BEACH.

In presence of—
H. D. MACKINNON,
WM. KENNEDY.